(12) United States Patent
Banerjee et al.

(10) Patent No.: US 11,339,569 B2
(45) Date of Patent: May 24, 2022

(54) UNITIZED CONSTRUCTION PANEL

(71) Applicant: NEXGEN COMPOSITES LLC, Franklin, OH (US)

(72) Inventors: Robin Banerjee, Centerville, OH (US); Michael S. Sheppard, Centerville, OH (US)

(73) Assignee: NEXGEN COMPOSITES LLC, Franklin, OH (US)

( * ) Notice: Subject to any disclaimer, the term of this patent is extended or adjusted under 35 U.S.C. 154(b) by 99 days.

(21) Appl. No.: 15/956,361

(22) Filed: Apr. 18, 2018

(65) Prior Publication Data
US 2018/0298609 A1    Oct. 18, 2018

Related U.S. Application Data

(60) Provisional application No. 62/486,861, filed on Apr. 18, 2017.

(51) Int. Cl.
*E04B 2/74* (2006.01)
*B32B 27/08* (2006.01)
(Continued)

(52) U.S. Cl.
CPC ............ *E04B 2/7411* (2013.01); *B32B 27/08* (2013.01); *B32B 27/14* (2013.01); *B32B 27/16* (2013.01);
(Continued)

(58) Field of Classification Search
CPC ........ E04B 2/7411; E04B 1/80; E04B 1/6145; B32B 27/08
See application file for complete search history.

(56) References Cited

U.S. PATENT DOCUMENTS 3,230,995 A * 1/1966 Shannon ................ E04C 2/284
156/166
3,708,385 A * 1/1973 Immethun ............. E04C 2/284
428/119
(Continued)

FOREIGN PATENT DOCUMENTS

| CA | 2894147 C | 10/2017 | | |
|---|---|---|---|---|
| WO | WO-2008075554 A1 | * | 6/2008 | .............. B63B 3/68 |
| WO | WO-2017180154 A1 | * | 10/2017 | .............. B32B 7/12 |

OTHER PUBLICATIONS

Machine Translation of WO-2008075554-A1 (Year: 2008).*
DPS Louisiana, Flame-Spread Ratings, Snapshot taken Apr. 13, 2015, Paragraphs 1-4 and Table 1 (Year: 2015).*

*Primary Examiner* — Jacob J Cigna
*Assistant Examiner* — Michael W Hotchkiss
(74) *Attorney, Agent, or Firm* — Thomas E. Lees, LLC

(57) ABSTRACT

A process for fabricating a unitized structure comprises creating a multilayer structure by applying a flame-retardant resin to a first layer and stacking, on the first layer, an intermediate layer comprising a honeycomb structure. Further, a second layer is stacked on the intermediate layer and the flame-retardant resin is applied to the second layer. The multilayer structure is then heated to a desired temperature and a pressure is applied about the multilayer structure for a predetermined process time. Moreover, the flame-retardant resin is prevented from entering spaces of the honeycomb structure. After elapse of the predetermined process time, the pressure is released, creating the unitized structure.

9 Claims, 16 Drawing Sheets

(51) Int. Cl.
  *B32B 37/14* (2006.01)
  *E04C 2/288* (2006.01)
  *B32B 27/14* (2006.01)
  *B32B 27/16* (2006.01)
  *E04C 2/284* (2006.01)
  *E04B 1/80* (2006.01)
  *E04B 1/94* (2006.01)
  *E04B 1/61* (2006.01)

(52) U.S. Cl.
  CPC .......... *B32B 37/146* (2013.01); *E04B 1/80* (2013.01); *E04B 1/942* (2013.01); *E04C 2/284* (2013.01); *E04C 2/288* (2013.01); *B32B 2250/03* (2013.01); *B32B 2307/3065* (2013.01); *B32B 2363/00* (2013.01); *B32B 2367/00* (2013.01); *B32B 2571/02* (2013.01); *B32B 2607/02* (2013.01); *E04B 1/612* (2013.01); *E04B 1/6104* (2013.01); *E04B 1/6125* (2013.01); *E04B 1/6145* (2013.01)

(56) References Cited

U.S. PATENT DOCUMENTS

| | | | | |
|---|---|---|---|---|
| 3,841,958 A * | 10/1974 | Delorme | ............... | B29C 44/186 428/117 |
| 4,241,555 A * | 12/1980 | Dickens | ................. | E04C 2/205 52/309.4 |
| 4,361,613 A * | 11/1982 | Bogner | .................... | B32B 5/18 428/119 |
| 4,617,217 A * | 10/1986 | Michaud-Soret | ....... | B29C 70/08 428/117 |
| 4,808,461 A * | 2/1989 | Boyce | ...................... | B32B 5/18 428/119 |
| 5,600,930 A * | 2/1997 | Drucker | ............. | B29C 33/0033 52/220.3 |
| 5,834,082 A * | 11/1998 | Day | ....................... | B29C 44/06 428/56 |
| 6,205,728 B1 * | 3/2001 | Sutelan | ................. | B29C 44/12 52/309.7 |
| 6,267,838 B1 * | 7/2001 | Saugnac | ............. | G10K 11/172 156/320 |
| 6,824,851 B1 * | 11/2004 | Locher | ................. | B29C 69/001 428/76 |
| 6,835,676 B2 * | 12/2004 | Kim | ........................ | B32B 5/18 428/328 |
| 7,225,596 B2 * | 6/2007 | Wrass | ...................... | E04B 7/22 52/784.14 |
| 7,393,577 B2 * | 7/2008 | Day | ......................... | B32B 5/22 428/121 |
| 7,897,235 B1 * | 3/2011 | Locher | ................... | B60R 13/08 428/71 |
| 7,938,922 B2 * | 5/2011 | Wang | ....................... | B32B 5/02 156/89.22 |
| 8,012,889 B2 * | 9/2011 | Balthes | ................ | B29C 43/003 428/920 |
| 8,349,444 B2 * | 1/2013 | Kipp | ....................... | C04B 28/26 428/318.4 |
| 8,389,107 B2 * | 3/2013 | Riebel | ..................... | B32B 7/12 428/195.1 |
| 8,419,883 B2 * | 4/2013 | Day | ................... | B29C 44/1285 156/264 |
| 8,591,677 B2 * | 11/2013 | Kipp | ..................... | C04B 38/085 156/39 |
| 9,493,938 B2 * | 11/2016 | Schiffmann | ............. | E04C 2/246 |
| 10,569,502 B2 * | 2/2020 | Baroux | ................. | B27N 9/00 |
| 2001/0042593 A1 * | 11/2001 | Zhou | ..................... | B29D 24/005 156/307.1 |
| 2009/0100780 A1 * | 4/2009 | Mathis | ..................... | E04B 1/14 52/578 |
| 2009/0252921 A1 * | 10/2009 | Bottler | ................. | B29C 70/443 428/116 |
| 2009/0311932 A1 * | 12/2009 | Hughes | .................... | B32B 5/20 442/224 |
| 2010/0143661 A1 * | 6/2010 | Warrick | ................... | F16F 1/40 428/174 |
| 2010/0196654 A1 * | 8/2010 | Maheshwari | ............. | B32B 5/26 428/102 |
| 2011/0081518 A1 * | 4/2011 | Day | ........................ | E04C 2/292 428/106 |
| 2012/0251814 A1 * | 10/2012 | Day | ..................... | B29C 70/086 428/309.9 |
| 2013/0287589 A1 * | 10/2013 | Adamse | ................. | B29C 70/48 416/241 A |
| 2014/0272247 A1 | 9/2014 | Latz et al. | | |
| 2015/0151509 A1 * | 6/2015 | Tompkins | ............... | B32B 5/026 428/158 |
| 2016/0167333 A1 * | 6/2016 | Hethcock, Jr. | ............ | B32B 3/12 428/116 |
| 2017/0268232 A1 * | 9/2017 | Renke | ...................... | E04C 2/46 |
| 2018/0207899 A1 * | 7/2018 | Mishra | .................. | B32B 27/285 |
| 2019/0283345 A1 * | 9/2019 | Uesaka | ................. | B32B 27/304 |

* cited by examiner

UNITIZED CONSTRUCTION PANEL

CROSS REFERENCE TO RELATED APPLICATIONS

This application claims the benefit of U.S. Provisional Patent Application Ser. No. 62/486,861, filed Apr. 18, 2017, entitled CONSTRUCTION PANEL SYSTEM INCORPORATING A UNITIZED STRUCTURE, the disclosure of which is hereby incorporated herein by reference.

BACKGROUND

Various aspects of the present disclosure relate generally to construction panels, and specifically to construction panel systems that incorporate unitized structures. Aspects also relate to methods of fabricating construction panels incorporating unitized structures.

Shelters, such as storage shelters and/or habitable shelters may be constructed using a wood frame construction that is either assembled on-site or is pre-manufactured into sections, e.g., walls, trusses, etc., that are assembled together on site. As a potential alternative to wood frame construction, structural insulation panels can be used. Structural insulated panels in some instances are manufactured under factory-controlled conditions and use a foam core that is disposed between structural facings, e.g., oriented strand board.

BRIEF SUMMARY

According to aspects of the present disclosure, a process for fabricating a unitized structure comprises creating a multilayer structure by applying a flame-retardant resin to a first layer and stacking, on the first layer, an intermediate layer comprising a honeycomb structure. Further, a second layer is stacked on the intermediate layer and the flame-retardant resin is applied to the second layer. The multilayer structure is then heated to a desired temperature and a pressure is applied about the multilayer structure for a predetermined process time. Moreover, the flame-retardant resin is prevented from entering spaces of the honeycomb structure. After elapse of the predetermined process time, the pressure is released, creating the unitized structure.

According to aspects of the present disclosure, a process is provided for fabricating a unitized structure. The process includes applying a fire-retardant resin to at least a portion of a multilayer structure. The multilayer structure has a first layer, an intermediate layer, and a second layer. The process also includes heating the multilayer structure and applying pressure about the multilayer structure for a predetermined process time. The process further includes releasing the applied pressure after elapse of the predetermined process time to produce a unitized structure. In this manner, the unitized structure can be utilized for a variety of purposes such as a unitized construction panel.

According to further aspects of the present disclosure, a process for fabricating a unitized structure having a desired fire rating is disclosed. The process includes obtaining an assembly, which has a first layer, a second layer, an intermediate layer comprising a low density insulating material, wherein the intermediate layer is disposed between the first layer and the second layer. The process also includes heating the assembly for a predetermined heating time and applying pressure about the assembly for a predetermined pressure time. The process further includes controlling a delivery operation of a fire-retardant resin such that upon completion of the predetermined pressure time and the predetermined heating time, a unitized structure having a desired fire rating is fabricated. In this manner, the unitized structure having a desired fire rating can be utilized for a variety of purposes such as a unitized construction panel.

According to yet further aspects of the present disclosure, a unitized construction panel is disclosed. The unitized construction panel has a first layer, a second layer, and an intermediate layer disposed between the first layer and the second layer. The intermediate layer itself includes a first material, a second material, spaced beams between the first material and the second material, and an insulating material between the beams and between the first material and the second material. At least one of the first layer, the second layer, and the intermediate layer, is treated with a fire-resistant or fire-retardant resin. The first layer, the second layer, and the intermediate layer are unitized using a vacuum process to generate a unitized construction panel.

BRIEF DESCRIPTION OF THE SEVERAL VIEWS OF THE DRAWINGS

The following is a brief description of the figures, which are not necessarily drawn to scale.

DETAILED DESCRIPTION

Overview

Figure 1:
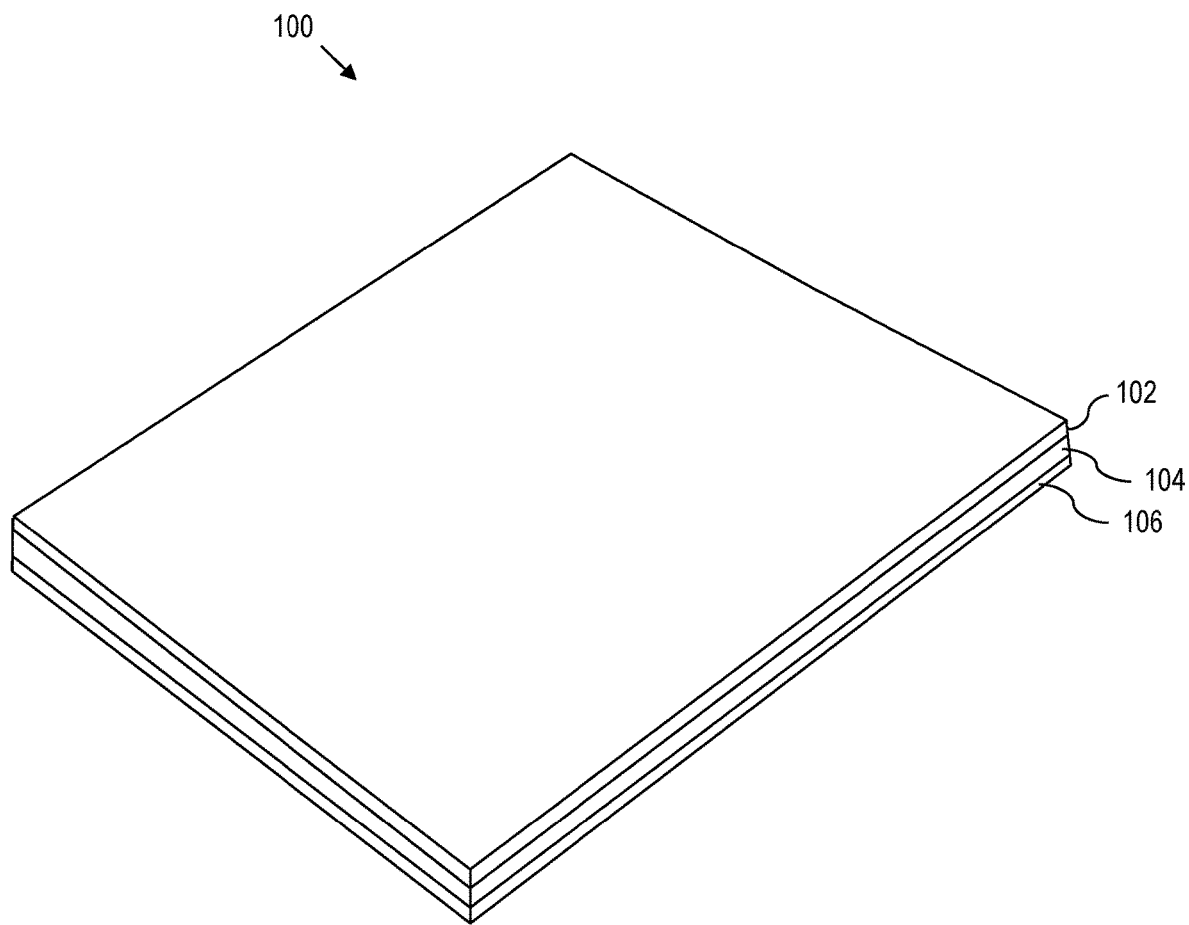
FIG. 1 is a perspective view of an example unitized structure according to aspects of the present disclosure.

The disclosure herein improves the technology of unitized structures. In particular, various aspects of the present disclosure address the technical problem of fabricating unitized structures (e.g., unitized construction panels) that are customizable at the time of fabrication to meet various needs of the end user (e.g., construction company, business chains, military, etc.).

These unitized structures, in certain applications, can be used to replace traditional wood frame construction and conventionally made construction panels. When these unitized structures are used as unitized construction panels, they may function as trench covers, scaffolding, road mats, and in other applications requiring a construction panel. Particularly, unitized construction panels as set out herein, can be fabricated to satisfy user-specified requirements, such as fire rating requirements, insulation (i.e., thermal insulation) rating requirements, sound proofing requirements, combinations thereof, etc., while providing a construction panel that is readily manufactured and implemented at a construction site.

Moreover, the unitized construction panels as disclosed herein can have increased durability, which can reduce for the potential for failure in a built structure when compared to traditional construction products and techniques. Further, various embodiments of the present disclosure can be customized with little to no retooling or expensive changes to the manufacturing process.

In certain embodiments, one or more layers can be added to the unitized structures (e.g., drywall, cement board, oriented strand board (OSB), etc.) to provide a surface that is familiar to contractors. The additional layer(s) can also contribute to the user-specified requirements (such as fire rating requirements, insulation rating requirements, sound proofing requirements, combinations thereof, etc.), and/or provide an ornamental appearance (e.g., by forming features, adding graphics or images to the layer(s), etc.), depending upon the use and configuration.

Further, the additional layers can also contribute to an overall fire rating/resistance. Such additional layers can also contribute to other desired attributes, such as sound proofing, insulation rating, or combinations thereof. Moreover, the unitized structures disclosed herein may be resistant to rot and/or may exhibit relatively more consistent structural integrity as compared to known construction panels. For example, the unitized structures disclosed herein may retain its structure across the temperature range between about −60° F. and about 160° F. (approximately −51° C. to 71° C.).

In this regard, the unitized structures described herein may be particularly well suited for construction applications such as storage shelters and/or habitable shelters including commercial buildings and residential housings but are not limited to such uses. Thus, total construction costs may be reduced, and/or structural integrity can be improved for a commercial building or a residential housing utilizing the disclosed unitized structure.

In general, an amount of materials used during fabrication can be controlled or customized to achieve desired unitized structure characteristics. For example, a desired weight can be achieved by controlling an amount of cellular material used to define or contribute to one or more layers.

As another example, in a unitized structure comprised of a first layer, a second layer, and an intermediate layer therebetween, a desired stiffness and/or strength can be achieved by controlling an amount and type of material of the first layer, the second layer, or both, of the unitized structure. As another example, a desired stiffness and/or strength can be achieved by controlling the material of the intermediate layer (e.g., adding stiffening members, beams, supports, etc.). Various materials may be used throughout such as dry fibrous materials, wood, balsa wood, mineral wool, batting, fiberglass (with or without ribs), foam, honeycomb, gypsum board, cement board, or combinations thereof. For instance, the intermediate layer can be selected to achieve desired performance with regard to fire, smoke, toxicity, combinations thereof, Moreover, the unitized structure fabricated herein can form part of a construction panel system. As an example, the unitized structure can be disposed between drywall or cement board panels to define a construction panel system as described in greater detail herein.

Example Embodiment of a Unitized Structure

Referring now to the drawings, and in particular to FIG. 1, a unitized structure 100 according to aspects of the present disclosure is illustrated. The unitized structure 100 comprises a first layer 102, an intermediate layer 104, and a second layer 106. The intermediate layer 104 is disposed between the first layer 102 and the second layer 106 to provide a multilayer structure (e.g., a multilayer insulated structure). The overall dimensions of the multilayer structure can vary. In an example implementation, the unitized structure 100 is square-shaped and has a side length of eight feet (approximately 2.44 meters) by eight feet (approximately 2.44 meters). In an alternative implementation, the unitized structure 100 is not square-shaped. For instance, an example unitized structure is eight feet (approximately 2.44 meters) by twenty-four feet (approximately 7.32 meters). Other dimensions and shapes can alternatively be implemented.

In an example implementation, the unitized structure 100 is used directly as a construction panel. In another example, the unitized structure 100 is disposed between facings such as drywall. In certain embodiments, the intermediate layer 104 of the unitized structure 100 further comprises spaced beam members between low density insulating material, which is discussed in greater detail below.

In various embodiments, each of the first layer 102 and the second layers 106 can comprise any combination of materials such as dry fibrous materials, wood, balsa wood, mineral wool, batting, fiberglass (with or without ribs), foam, honeycomb, gypsum board, cement board, or combinations thereof. Further, other implementations of the dry fibrous material may be used, such as basalt, quartz, jute, carbon, etc. In some embodiments, a scrim is present on the intermediate layer 104, e.g., between the intermediate layer and the first layer 102.

In practice, it is possible that the second layer 106 and the first layer 102 comprise the same material. In alternative implementations, the materials used for the first layer 102 may be different than the materials used for the second layer 106.

In some embodiments, the intermediate layer 104 comprises a low density insulating material (e.g., cellular insulating material), such as a foam board, a low-density plastic foam with cross ribs, fiberglass rib-reinforced foam, expanded polystyrene, extruded polystyrene, polyisocyanurate, combination of foam and an inorganic fire-retardant material, a combination of foam and wood (e.g., plywood, hardwood, balsa wood, combinations thereof, etc.), segmented or compartmentalized materials (e.g., a honeycomb material with or without a scrim or base layer), combinations thereof, etc.

Figure 2:
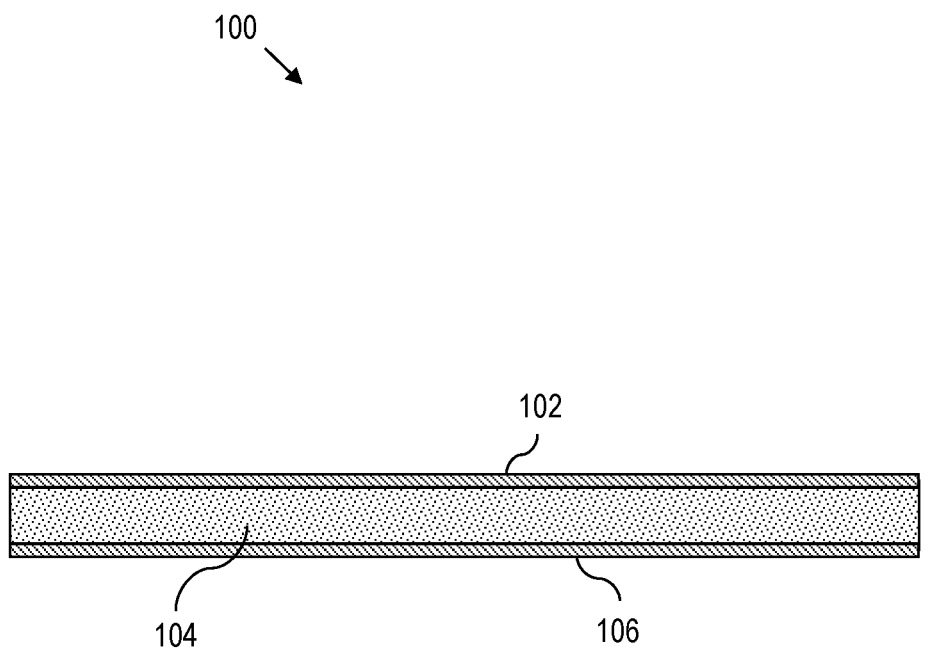
FIG. 2 is a vertical cross-sectioned, side view of the example unitized structure as shown in FIG. 1 according to aspects of the present disclosure.

FIG. 2 illustrates a vertical cross-sectional view of the unitized structure 100. As such, like elements are illustrated with like reference numbers. In various embodiments, the unitized structure 100 may be infused with a fire-retardant resin so as to exhibit a desired fire rating. Other types of resins and implementations of the unitized structure 100 are possible as described in greater detail herein.

In an example implementation, the intermediate layer 104, e.g., a layer of foam, is disposed between the first layer 102, e.g., a layer of balsa wood, and the second layer 106, e.g., another layer of balsa wood. The balsa wood defining the first layer 102 and the second layer 106 provide less insulation than the layer of foam defining the intermediate layer 104 but provide more fire resistance than the layer of foam defining the intermediate layer 104. In yet other implementations, the intermediate layer 104 can comprise one or more beams or other framing, such as steel, aluminum, composite material, etc., which can be spaced between columns of cellular material, as discussed in greater detail below.

A Process for Fabricating a Unitized Structure

Figure 3:
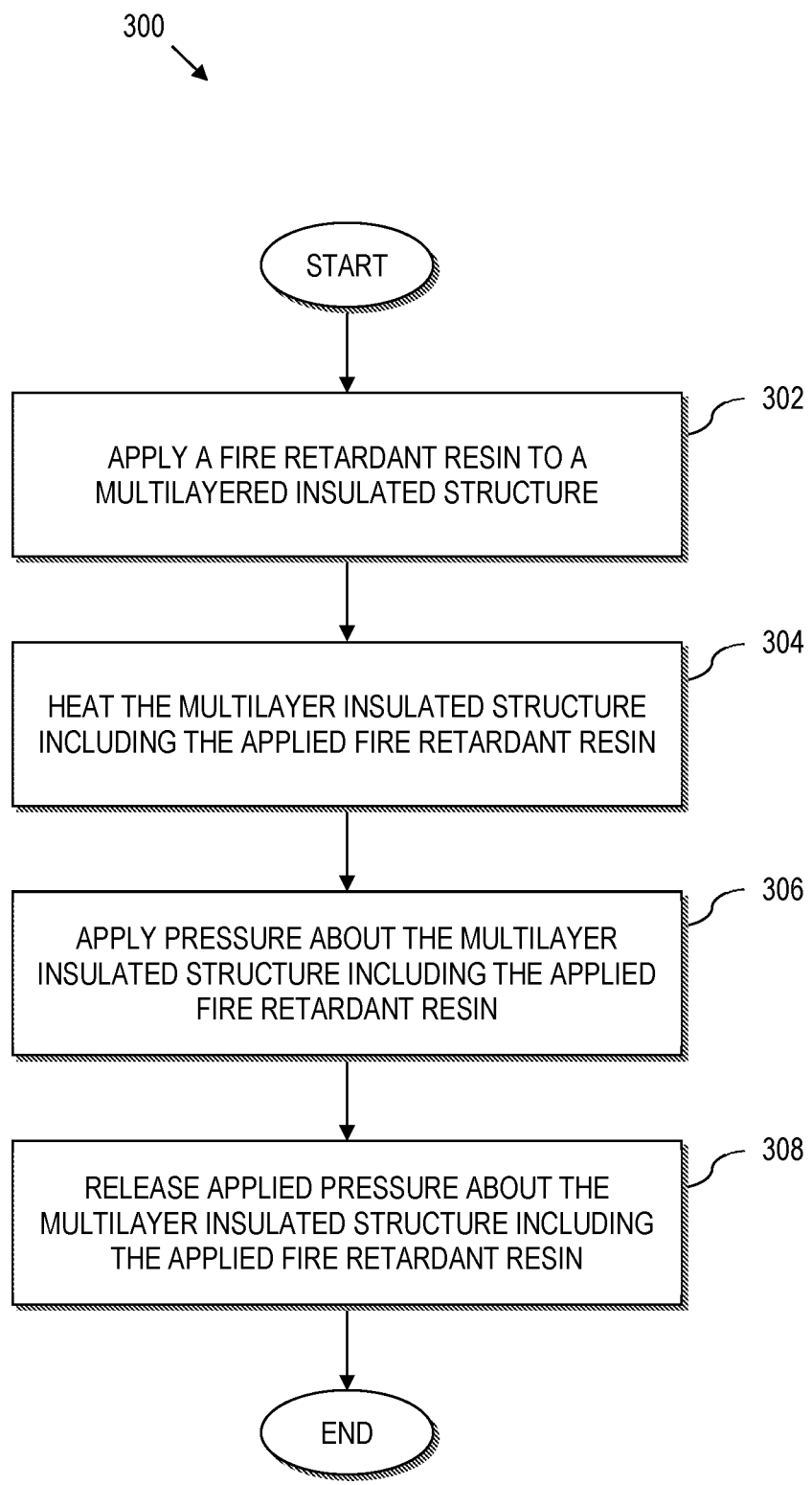
FIG. 3 is a flowchart depicting an example process for fabricating a unitized structure according to aspects of the present disclosure.

Now referring to FIG. 3, a process 300 for fabricating a unitized structure is disclosed. The process 300 can incorporate the various definitions, hardware, components, and embodiments disclosed in FIGS. 1-2, and can be combined in any combination of components described with reference thereto. In this regard, not every disclosed component need be incorporated.

The process 300 comprises applying at 302 a fire-retardant resin to at least a portion of a multilayer structure, the multilayer structure comprising a first layer, a second layer, and an intermediate layer disposed between the first layer and the second layer, wherein the intermediate layer comprises a low density insulating material. In some implementations, the amount of resin applied is metered to provide a desired fire rating (e.g., American Society for Testing and Materials (ASTM) E-84, National Fire Protection Association (NFPA) 101, etc.). For example, the fire-retardant resin may be applied to each layer (or a subset of the layers) as the layers are added to the structure.

In various implementations, the fire-retardant resin (also referred to as flame-retardant resin herein) comprises a liquid phenolic resin. In further implementations, the fire-retardant resin can comprise varying amounts of inorganic filler material. The fire-retardant resin may be customized or selected based on fire related attributes such as flame spread, overall fire resistance, smoke production, contaminates, etc. For instance, the ratio of fillers and inorganic fire-resistant material can be controlled to achieve the desired fire rating. For example, calcium carbonate may be added to a flame-retardant resin to thicken (i.e., reduce viscosity) the flame-retardant resin so the flame-retardant resin is suitable for use in the unitizing process. If the flame-retardant resin is too viscous, then the flame-retardant resin may adversely affect process parameters to realize a unitized structure, e.g., by affecting uniform distribution.

In numerous implementations, the intermediate layer 104 comprises a series of beam members such that the low density insulating material is between adjacent beam members of the series of beam members. For example, beam members may be installed at set intervals throughout the low density insulating material of the intermediate layer 104 (e.g., a beam spaced every six inches (15.24 centimeters) or greater throughout the low density insulating material of the intermediate layer). In other examples, the series beam members are installed sporadically.

The process 300 further comprises heating at 304, the multilayer structure including the applied fire-retardant resin. In some implementations, heating the multilayer structure, including the applied fire-retardant resin, comprises heating the multilayer structure at a specified temperature and time. For example, the multilayer structure may be heated at a temperature range of 80° F. to 500° F. (approx. 26° C. to 260° C.) for at least 10 minutes.

Moreover, the process 300 comprises applying, at 306, pressure about the multilayer structure including the applied fire-retardant resin for at least a predetermined process time. In some implementations, applying pressure about the multilayer structure comprises applying pressure for at least a predetermined process time within a specific pressure range. For example, pressure may be applied with a pressure of about one Torr and about 760 Torr (approximately 133 Pascal to 101,325 Pascal) for at least 10 minutes while the multilayer structure is being heated at 304. Alternatively, pressure may be applied while the multilayer structure is not being heated. For example, pressure applied to the multilayer structure may be alternated with heat applied to the multilayer structure intermittently. Moreover, pressure may be applied using various techniques such as using a mechanical press or by drawing a vacuum.

The amount of pressure applied to the multilayer structure should be enough to allow the flame-retardant resin to penetrate the first layer but not as much that would allow the flame-retardant resin to penetrate spaces of the intermediate layer. For example, in embodiments where the intermediate layer includes a honeycomb structure, the pressure should be enough to penetrate the first layer (depending on the materials and thickness of the first layer). However, the pressure should not be so much as to allow the flame-retardant resin into spaces of a honeycomb structure or other structures with intentional voids. In some embodiments, a scrim (which can be part of the intermediate layer or a separate layer) helps prevent the flame-retardant resin from getting into the spaces of the honeycomb structure.

Yet further, the process 300 comprises releasing at 308, after elapse of the predetermined process time, the pressure applied at 306 about the multilayer structure including the applied fire-retardant resin to produce the unitized structure.

In various embodiments, applying at 302, a fire-retardant resin to at least a portion of a multilayer structure comprises applying the fire-retardant resin to at least a portion of a multilayer structure such that upon completion of the predetermined vacuum time, a unitized structure that has a desired fire rating is produced.

In this regard, the desired fire rating of the unitized structure can vary based on need. In various embodiments, the unitized structure has a fire-resistance rating of class 3, class C, American Society for Testing and Materials (ASTM) E-84, or higher. Various entities that work with fire-retardant material may categorize fire-resistance ratings differently from one another. For instance, some entities may refer to a class of fire-resistant/retardant materials numerically (e.g., Class 3), and other entities (e.g., National Fire Protection Association (NFPA) 101) may refer to a class of fire-resistant/retardant materials alphabetically (e.g., Class C). To account for the discrepancy between entities, fire-resistance/retardant ratings may be noted as Class A/1, B/2, or C/3.

Materials suitable for the fire-retardant resin include, but are not limited to phenolic resin, polyester, vinyl ester, epoxy, etc. Additionally, additives and/or fillers such as alumina trihydrate (ATH), antimony, inorganic materials, etc., can be added to the fire-retardant resin to enhance fire retardant properties.

A Process for Fabricating a Unitized Structure Having a Desired Fire Rating

Figure 4:
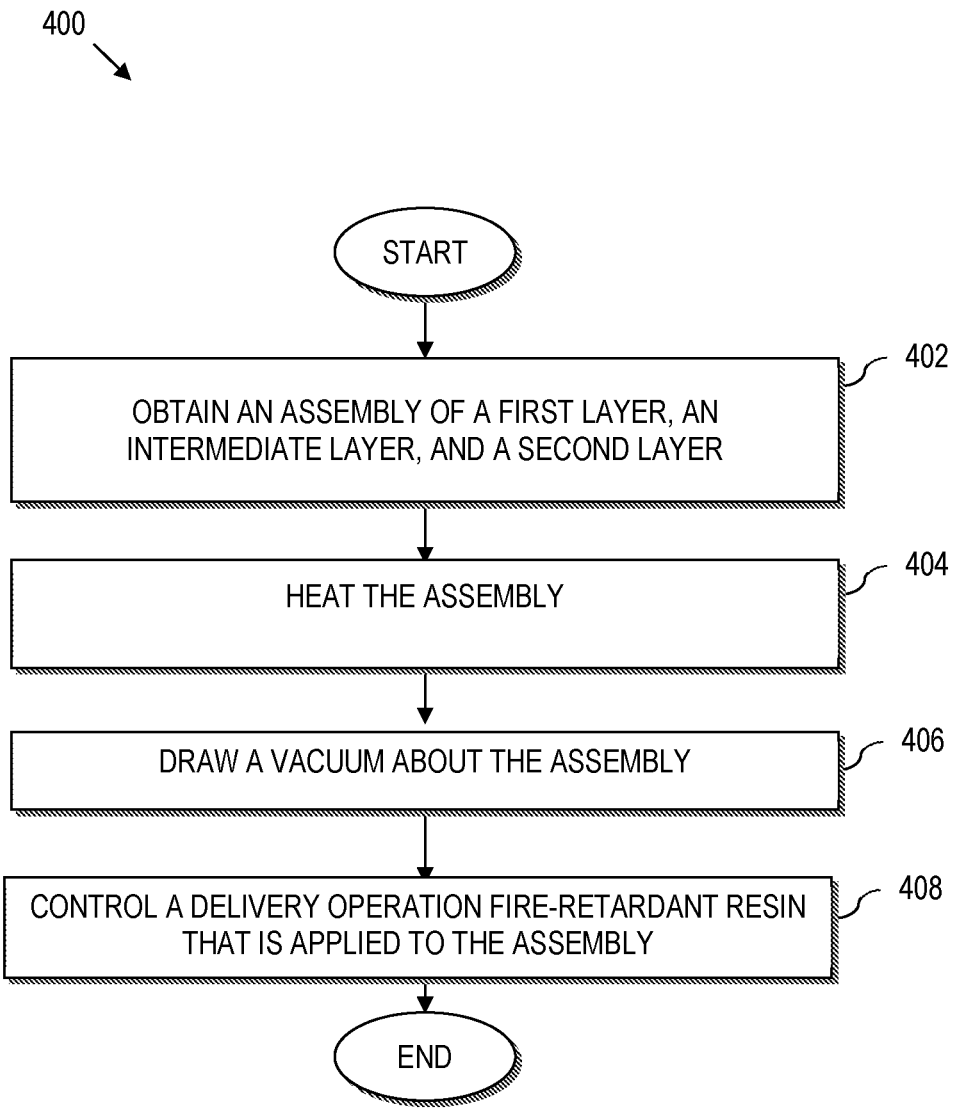
FIG. 4 is a flowchart depicting an example process for fabricating a unitized structure having a desired fire rating according to aspects of the present disclosure.

Referring to FIG. 4, a process 400 for fabricating a unitized structure having a desired fire rating is illustrated. The process 400 can incorporate the various definitions, hardware, components, processes, and embodiments disclosed in FIGS. 1-3, and can be combined in any combination of components described with reference thereto. In this regard, not every disclosed component need be incorporated.

The process 400 comprises obtaining at 402, an assembly. The assembly comprises a first layer, a second layer, and an intermediate layer comprising a low density insulating material, wherein the intermediate layer is disposed between the first layer and the second layer.

In various embodiments, each layer (i.e., the first layer, second layer, and intermediate layer) can comprise multiple layers or materials. For example, a first layer may comprise a thin porous fiberglass layer and a woven (e.g., fabric type) fiberglass layer.

In various embodiments, the process 400 further comprises installing a series of beam members over the first layer, wherein the series of beam members are disposed throughout the low density insulating material. For example, beam members may be installed at set intervals throughout the low density insulating material of the intermediate layer. In an example beams are spaced every six inches (15.24 centimeters) or greater, throughout the low density insulating material. In other examples, the series beam members are spaced sporadically. Suitable materials for the series of beams include, but is not limited to plywood, hardwood, and balsa wood.

In example implementations, the series of beam members can be horizontally oriented, vertically oriented, or a combination thereof (e.g., forming a grid or "web" of beams) with respect to the first layer and the second layer. For instance, the series of beam members can comprise unidirectional ribs with fiberglass-reinforced foam between the unidirectional ribs (e.g., with or without beams, framing, etc. over the first layer).

In this regard, the amount of fiberglass-reinforced foam in each web defined between the unidirectional ribs can be between about 25 grams per square meter and about 1500 grams per square meter of fiberglass-reinforced foam; and web spacing between adjacent webs can be between about 0.4 inches and about 197 inches (about one centimeter and about 500 centimeters).

The process further comprises heating at 404, the assembly for a predetermined heating time. Previously disclosed processes and embodiments can apply (e.g., heating at 80° F. to 500° F., (approximately 26.67° C. to 260° C.), for at least 10 minutes) herein. In various embodiments heating 404 the assembly can be performed by placing the assembly on a surface that can modulate temperature or placed into an environment that can modulate temperature.

Moreover, heating the assembly can be performed dynamically throughout the process 400. For instance, heating may take place continuously throughout the process 400, in intervals throughout the process 400, only during certain portions of the process 400, etc.

In various implementations, heating at 404 the assembly for a predetermined heating time may comprise heating the assembly at a first temperature for a first predetermined heating time and heating the assembly at a second temperature for a second predetermined heating time. Such an implementation may allow the various layers of the assembly to more easily unitize.

The process yet further comprises applying at 406, pressure about the assembly for a predetermined pressure time. Previously disclosed processes and embodiments can apply (e.g., drawing a vacuum with a pressure between about one Torr and about 760 Torr (or approximately 133 Pascal to 101,325 Pascal) for at least 10 minutes). Also, referring back to heating 404 the assembly, in some embodiments the process 400 may comprise heating 404 the assembly while pressure is being applied 406.

The process also comprises controlling at 408, a delivery operation wherein fire-retardant resin is applied to at least a portion of the assembly such that upon completion of the predetermined vacuum time and the predetermined heating time, a unitized structure having a desired fire rating is fabricated. In many implementations, the unitized structure having the desired fire rating is planar-shaped (e.g., analogous to the unitized structure 100 illustrated in FIG. 1). However, the process 400 in other implementations further comprises controlling the formation of the assembly such that the unitized structure having a desired fire rating is curved.

In various implementations, controlling at 408, a delivery operation wherein fire-retardant resin is applied to at least a portion of the assembly comprises applying a fire-retardant resin that has a predetermined ratio of foam and inorganic fire-retardant material to achieve a desired fire rating, wherein the achieved desired fire rating is at least class 3/C.

In yet further implementations, the process 400 further comprises adding features that are selected based upon the intended application of the unitized structure.

For example, if the intended application of the unitized structure is construction, the process 400 may further comprise adding a feature such as shaping at least one edge of the unitized structure to provide a tongue that is engageable with a groove of another unitized structure; shaping at least one edge of the unitized structure to provide a groove that is engageable with a tongue of another unitized structure; shaping the unitized structure to engage with a select one of a separate spline connector and a separate surface tie plate; shaping at least one edge of the unitized structure to engage with another unitized structure to provide a joint (e.g., shiplap joint); or combinations thereof, etc.

In further examples, the process 400 may also comprise providing a conduit that passes through at least a portion of the unitized structure.

In yet further implementations, the process 400 may further comprise installing on the unitized structure having a desired fire rating, at least one of a metal cladding, and an embedded hard point formed from a select one of hardwood, metal, a laminate, plastic material, and a high-density foam.

In some implementations, the process further comprises controlling the amount of the fire retardant resin applied to the at least a portion of the multilayer structure (or component(s) thereof) based on at least one of an amount of low density cellular material installed over the first layer, an amount of foam in the low density cellular material, an amount of web fiber in the low density cellular material, and the number of beam members in the series of beam members, a combination thereof, etc.

The following are examples of unitized structures, which can be used as (or part of) a unitized construction panel.

Intermediate Layer

Figure 5:
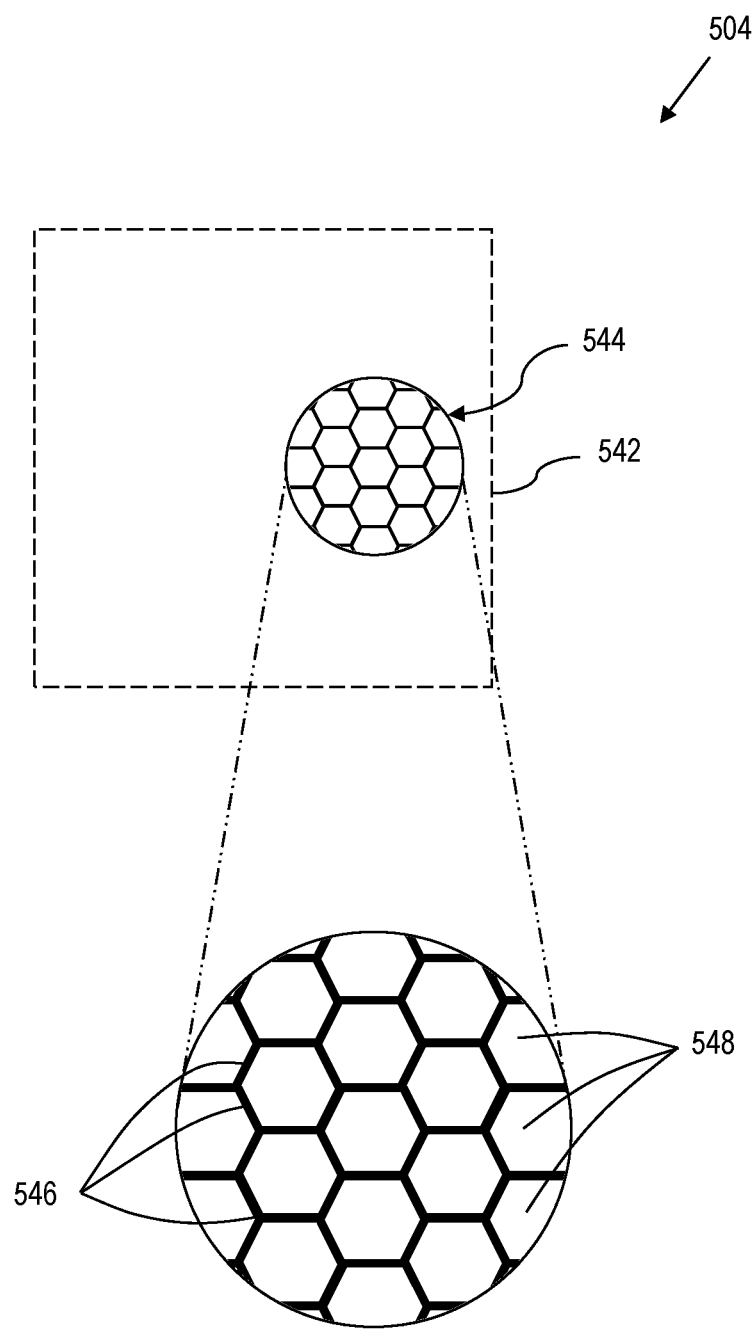
FIG. 5 is a surface view of a unitized structure, which includes an enlarged view of a portion of the panel with some material removed to reveal yet additional details according to aspects of the present disclosure.

FIG. 5 illustrates an example embodiment of an intermediate layer 504, which can be used as the intermediate layer 104 of any of the unitized structures described herein. In this example, the intermediate layer 504 includes a scrim 542 and a honeycomb structure 544. As shown in FIG. 5, there is a cutout in the scrim 542 to illustrate the honeycomb structure 544 in greater detail. However, in practice, the scrim 542 should cover the entire honeycomb structure 544 of the intermediate layer 504. Further, the honeycomb structure 544 includes walls 546 and spaces 548 between the walls 546. During manufacturing, when pressure is applied to a multilayer structure that includes the embodiment of the intermediate layer 504 of FIG. 5, the scrim 542 helps prevent fire-retardant resin from entering the spaces 548 of the honeycomb structure 544 until the resin cures.

In some embodiments, the scrim 542 is manufactured as part of the honeycomb structure 544. In other embodiments, the scrim 542 is a separate layer added between the first layer 102 and the intermediate layer 104 (intermediate layer 504).

First Example Unitized Structure

Figure 6A:
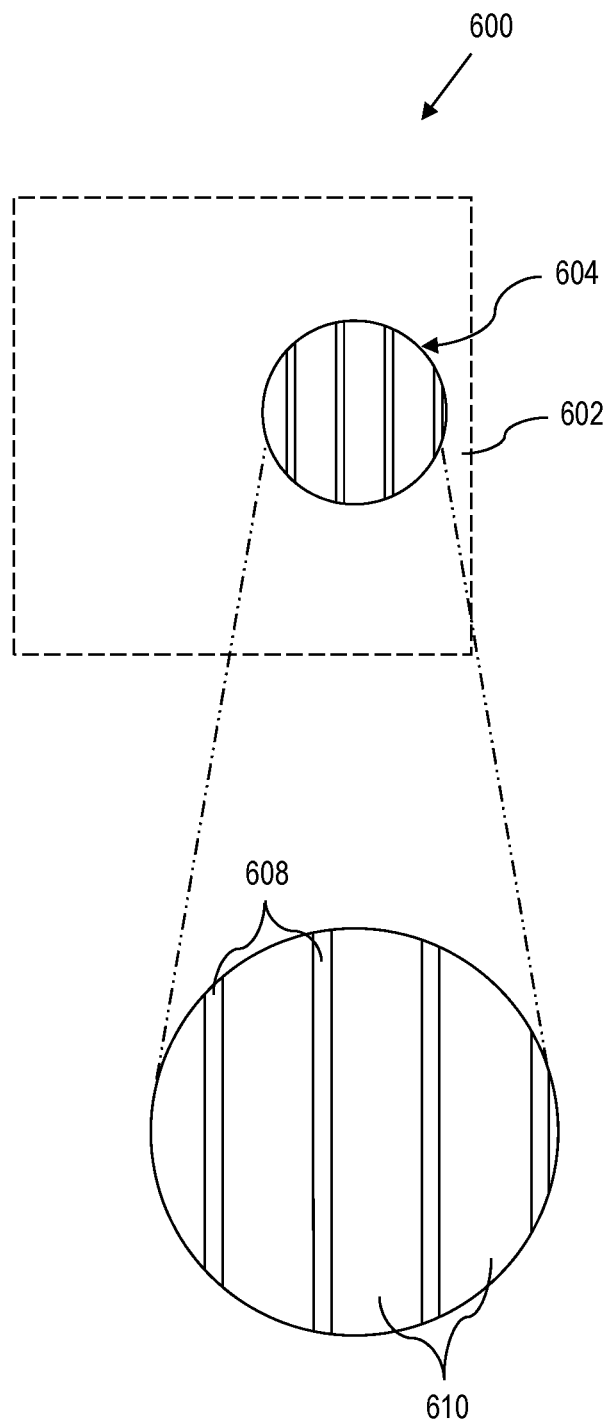
FIG. 6A is a surface view of a unitized structure, which includes an enlarged view of a portion of the panel with some material removed to reveal additional details according to aspects of the present disclosure.

In an example implementation shown in FIG. 6A, a unitized structure 600 is illustrated according to aspects of the present disclosure. The unitized structure 600 is similar to the unitized structure 100 shown in FIGS. 1 and 2. As such, like components are illustrated with like reference numerals 500 higher than shown in FIGS. 1 and 2. The unitized structure 600 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated.

As shown in the enlarged portion of the unitized structure 600 in FIG. 6A, a portion of the first layer 602 is removed to reveal that the material of the intermediate layer 604 is comprised of unidirectional ribs 608 and fiberglass-reinforced foam 610 between the unidirectional ribs 606. In this particular embodiment, the unidirectional ribs extend in the longitudinal direction (Y-axis if the unitized structure is laid flat).

Second Example Unitized Structure

Figure 6B:
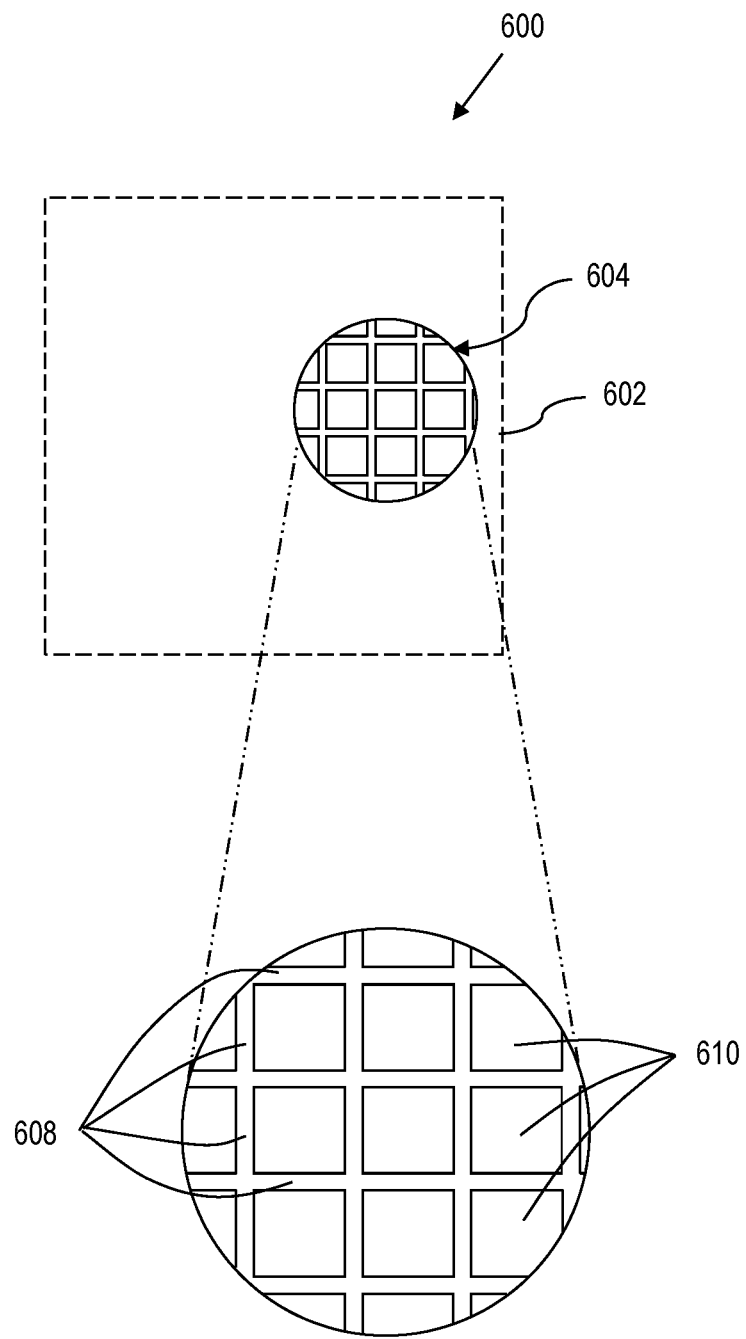
FIG. 6B is a surface view of a unitized structure, which includes an enlarged view of a portion of the panel with some material removed to reveal further additional details according to aspects of the present disclosure.

In another example implementation shown in FIG. 6B, a unitized structure 500 is illustrated according to aspects of the present disclosure. The unitized structure 500 is similar to the unitized structure 100 shown in FIGS. 1 and 2. As such, like components are illustrated with like reference numerals 400 higher than shown in FIGS. 1 and 2. The unitized structure 600 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated.

As shown in the enlarged portion of the unitized structure 600 in FIG. 6B, a portion of the first layer 602 is removed to reveal that the cellular material of the intermediate layer 604 is comprised of bidirectional ribs 608 and fiberglass-reinforced foam 610 installed between the bidirectional ribs 608.

Where different types of foam material (either with or without ribs) are provided, the different materials that make up the foam material can be interleaved, book-ended, or arranged in other patterns. The foam material can include a combination of low density closed cell foam, foam material covered on at least one face by fibrous reinforcement material, fiberglass-reinforced plastic, etc. Moreover, reinforcements can be provided, e.g., transverse plates, ribbing, etc., to increase the strength of the foam material for a given application.

Third Example Unitized Structure

Figure 7:
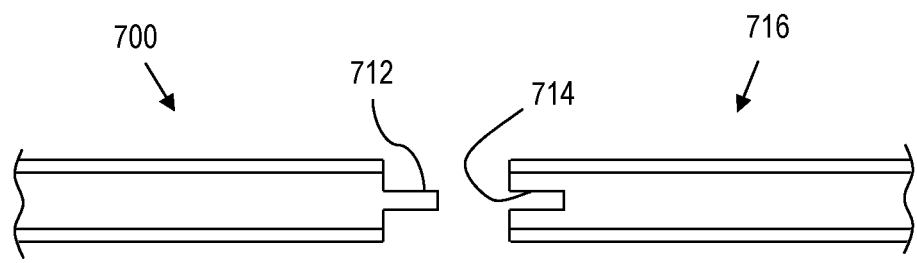
FIG. 7 is an edge view of a tongue of one unitized structure facing a groove of another unitized structure.

In another example implementation shown in FIG. 7, a unitized structure 700 is illustrated according to aspects of the present disclosure. The unitized structure 700 is similar to the unitized structure 100 shown in FIGS. 1 and 2. As such, like components are illustrated with like reference numerals 600 higher than shown in FIGS. 1 and 2. The unitized structure 600 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated.

As shown in FIG. 7, at least one edge of the unitized structure 700 is shaped to provide a tongue 712 that is engageable with a groove 714 of another unitized structure designated with reference numeral 716. The tongue 712 and the groove 714 engage to interlock the pair of adjacent unitized structures 700, 716 together. The tongue 712 and the groove 714 can be formed using any suitable manufacturing technique.

Fourth Example Unitized Structure

Figure 8:
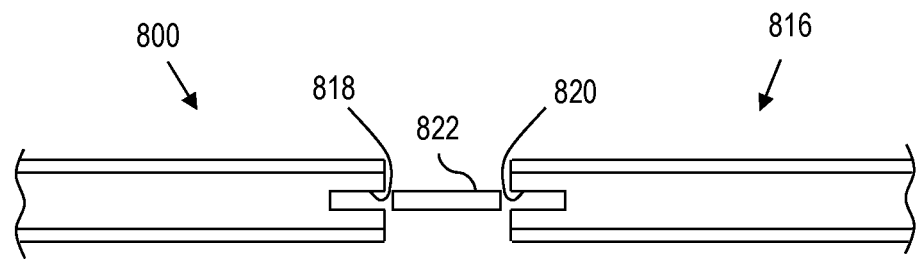
FIG. 8 is an edge view of a tenon positioned between a groove of one unitized structure and a groove of another unitized structure.

In another example implementation shown in FIG. 8, a unitized structure 800 is illustrated according to aspects of the present disclosure. The unitized structure 800 is similar to the unitized structure 100 shown in FIGS. 1 and 2. As such, like components are illustrated with like reference numerals 700 higher than shown in FIGS. 1 and 2. The unitized structure 800 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated.

As shown in FIG. 8, at least one edge of a unitized structure 800 is shaped to provide a first groove 818 that faces a second groove 820 of another unitized structure 816. The grooves 818, 820 can be formed using any suitable manufacturing technique. Each of the grooves 818, 820 receives a portion of a tenon 822 (also referred to herein as a spline) that is positioned between the grooves 818, 820. More specifically, one end portion of the tenon 822 engages the first groove 818 and an opposite end portion of the tenon 822 engages the second groove 820 to interlock the adjacent pair of unitized structures 800, 816 together.

Fifth Example Unitized Structure

Figure 9:
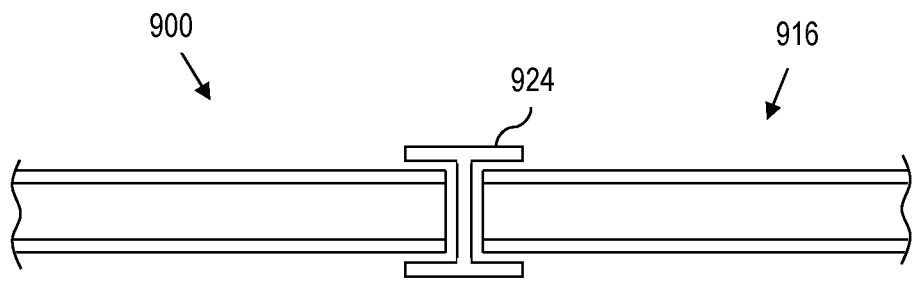
FIG. 9 is an edge view of a joint of one unitized structure facing a joint of another unitized structure.

In another example implementation shown in FIG. 9, a unitized structure 900 is illustrated according to aspects of the present disclosure. The unitized structure 900 is similar to the unitized structure 100 shown in FIGS. 1 and 2. As such, like components are illustrated with like reference numerals 800 higher than shown in FIGS. 1 and 2. The unitized structure 900 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated.

As shown in FIG. 9, a separate connection piece 924 is disposed between the unitized structure 900 and another unitized structure 916. The connector piece 924 allows the unitized structure 900 and the unitized structure 916 to be fastened together. Other types and shapes of separate connector pieces are possible.

In some implementations, the separate connection piece 924 is an H-shaped spline connector as shown in FIG. 9. In other implementations, the separate connection piece can be T-shaped (which is the H-shape with one side removed). In various implementations, the separate connection piece can be a separate surface tie plate or plates (which is the T-shape with the vertical portion of the "T" removed).

Sixth Example Unitized Structure

Figure 10:
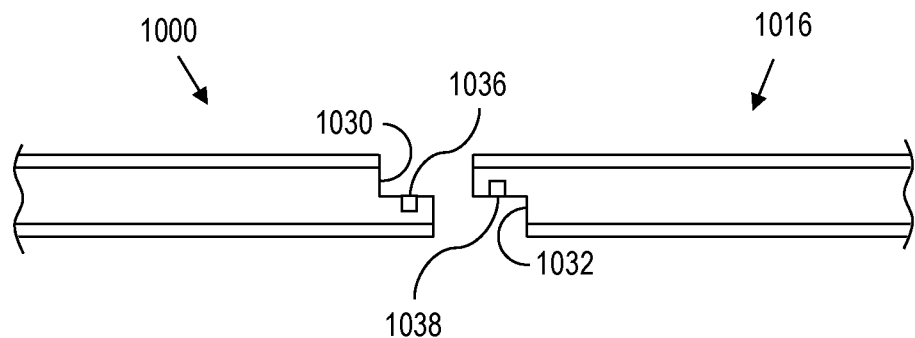
FIG. 10 is an edge view of a separate connector piece between one end of one unitized structure and one end of another unitized structure.

In another example implementation shown in FIG. 10, a unitized structure 1000 is illustrated according to aspects of the present disclosure. The unitized structure 1000 is similar to the unitized structure 100 shown in FIGS. 1 and 2. As such, like components are illustrated with like reference numerals 900 higher than shown in FIGS. 1 and 2. The unitized structure 1000 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated.

As shown in FIG. 10, at least one edge of the unitized structure 1000 is shaped to provide a joint 1030 (e.g., a shiplap joint as shown) that is engageable with a joint 1032 of another unitized structure 1016 to allow the pair of unitized structures 1000, 1016 to be fastened and interlocked together.

In certain embodiments, the unitized structure 1000 has a slot 1036, and the unitized structure 1016 has a slot 1038 that faces the slot 1036 of the unitized structure 1000. Here, an optional piece of material (not shown), such as an aluminum piece of material, extends between the slots 1036, 1038. This configuration may reduce the amount of air from passing through the shiplap joint, thereby providing improved thermal insulation. This configuration can also be used to interrupt a conduction path. Moreover, a bracket feature can be added along an edge of the unitized panel to provide a thermal break.

In alternative implementations, any type of joint other than a shiplap joint can be implemented, with or without airflow, conduction path, etc. restricting features. For example, a unitized structure can have a type of joint that allows the unitized structure to be angled for connection to a wall, a ceiling, or a wall corner.

Seventh Example Unitized Structure

Figure 11:
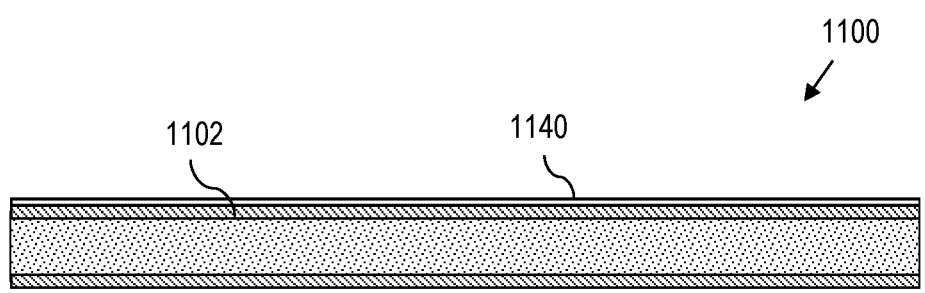
FIG. 11 is a vertical cross-sectioned, side view of an alternate embodiment of the unitized structure of FIG. 1 according to aspects of the present disclosure.

In another example implementation shown in FIG. 11, a unitized structure 1100 is illustrated according to aspects of the present disclosure. The unitized structure 1100 is similar to the unitized structure 100 shown in FIGS. 1 and 2. As such, like components are illustrated with like reference numerals 1000 higher than shown in FIGS. 1 and 2. The unitized structure 1100 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated.

As shown in FIG. 11, a first skin 1140 is integrated into the first layer 1102. For clarity of discussion, the thickness of the first skin 1140 is shown exaggerated. The first skin 1140 is comprised of at least one of a glossy surface, a non-skid surface, a paintable surface, a gel coat surface, a film surface, a solar reflective surface, and an integrated graphic that is visible when facing the first layer 1102.

Eighth Example Unitized Structure

Figure 12A:
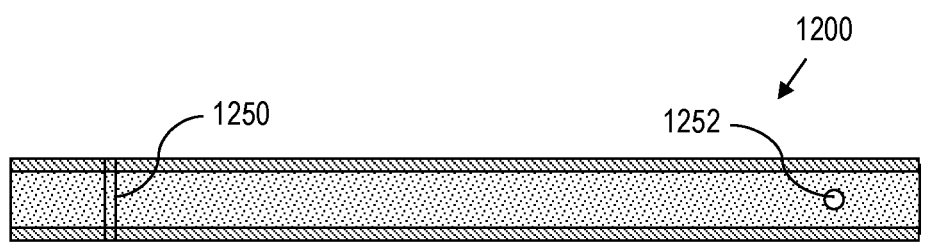
FIG. 12A is a vertical cross-sectioned, side view of an alternate embodiment of the unitized structure of FIG. 1 according to aspects of the present disclosure.
Figure 12B:
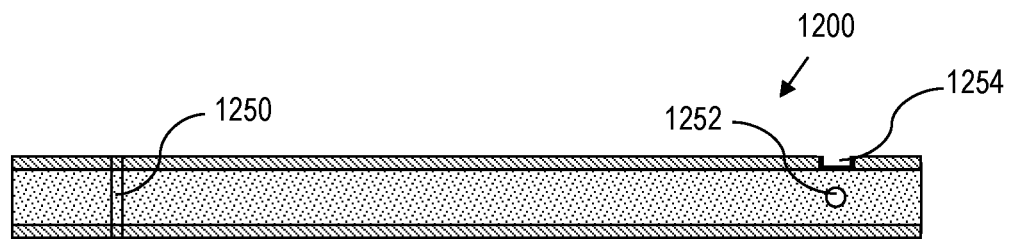
FIG. 12B is a vertical cross-sectioned, side view of an alternate embodiment of the unitized structure of FIG. 12A according to aspects of the present disclosure.

In another example implementation shown in FIG. 12A and a variant implementation in FIG. 12B, a unitized structure 1200 is illustrated according to aspects of the present disclosure. The unitized structure 1200 is similar to the unitized structure 100 shown in FIGS. 1 and 2. As such, like components are illustrated with like reference numerals 1100 higher than shown in FIGS. 1 and 2. The unitized structure 1200 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated.

As shown in FIG. 12A, the unitized structure 1200 comprises one or more conduits that pass through the unitized structure 1200 in one or more directions. As an example, a first conduit 1250 passes through at least a portion of the unitized structure 1200 in a direction orthogonal to the plane in which the unitized structure 1200 lies. As another example, a second conduit 1252 passes through at least another portion of the unitized structure 1200 in a direction parallel to the plane in which the unitized structure 1200 lies. Each of the conduits 1250, 1252 can be any type of conduit, such as an electrical conduit or a water conduit. Each of the conduits 1250, 1252 can be shaped and pass through the unitized structure 1200 in one or more directions as the specific application dictates.

FIG. 12B illustrates a variant embodiment to the unitized structure 1200. In this embodiment, the unitized structure 1200 further comprises a recessed port 1254. The recessed port 1254 may be used for a variety of functions such as a provide a space for recessed lighting, electrical outlet boxes, control box for appliances, locks, brackets, etcetera. While only one recessed port 1254 is shown, multiple recessed ports could be integrated on a single unitized structure.

Ninth Example Unitized Structure

Figure 13:
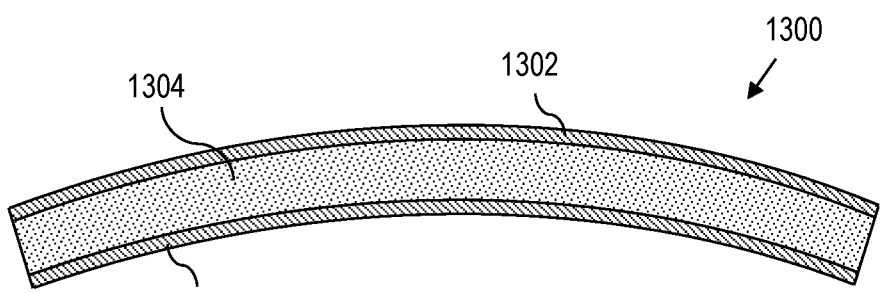
FIG. 13 is a vertical cross-sectioned, side view of an alternate embodiment of the unitized structure of FIG. 1 according to aspects of the present disclosure.

In another example implementation shown in as shown in FIG. 13, a unitized structure 1300 is illustrated according to aspects of the present disclosure. The unitized structure 1300 is similar to the unitized structure 100 shown in FIGS. 1 and 2. As such, like components are illustrated with like reference numerals 1200 higher than shown in FIGS. 1 and 2.

The unitized structure 1300 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated.

As shown in FIG. 13, fabrication of the first layer 1302, the intermediate layer 1304, and the second layer 1306 is controlled such that the resulting fire-retardant resin infused composite insulated unitized structure 1300 is curved (i.e., instead of planar-shaped (i.e., flat) as shown in the implementation of FIGS. 1 and 2).

Tenth Example Unitized Structure

Figure 14:
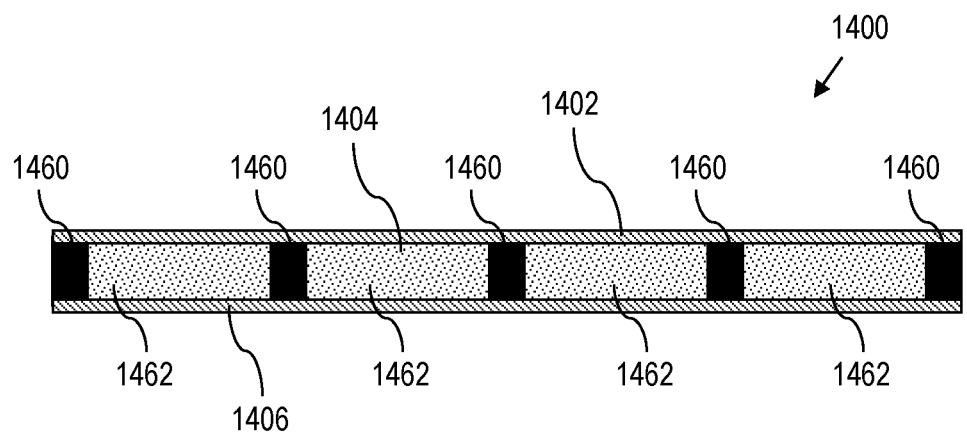
FIG. 14 is a vertical cross-sectioned, side view of an alternate embodiment of the unitized structure of FIG. 1 according to aspects of the present disclosure.

In another example implementation shown in FIG. 14, a unitized structure 1400 is illustrated according to aspects of the present disclosure. The unitized structure 1400 is similar to the unitized structure 100 shown in FIGS. 1 and 2. As such, like components are illustrated with like reference numerals 1300 higher than shown in FIGS. 1 and 2. The unitized structure 1400 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated.

As shown in FIG. 14, the intermediate layer 1404 comprises a series of beam members 1460 and low density insulating material 1462 disposed between adjacent beam members of the series of beam members 1460. Each beam member of the series of beam members 1460 comprises a material such as wood, steel, aluminum, a composite, etc. Other materials of each beam member of the series of beam members 1460 are possible.

In various implementations, the cross section of each beam member has a generally rectangular shape as shown in FIG. 14. Each beam member can have dimensions corresponding to conventional building materials, e.g. framing such as 2×4, 2×6, etc. Other cross-sectional shapes and thicknesses are possible. The low density insulating material can comprise any intermediate material (or combination of materials) described more fully herein.

In an example implementation, the low density insulating material comprises a combination of foam and an inorganic fire-retardant material. Other materials of the low density insulating material are possible. The intermediate layer 1404 is disposed between the first layer 1402 and the second layer 1406. Each of the first and second layers 1402, 1406 can comprise a fibrous cloth have a thickness between about 0.030 inches (0.076 centimeters) and about 0.100 inches (0.254 centimeters). Other materials and thicknesses are suitable as well.

Eleventh Example Unitized Structure

Figure 15:
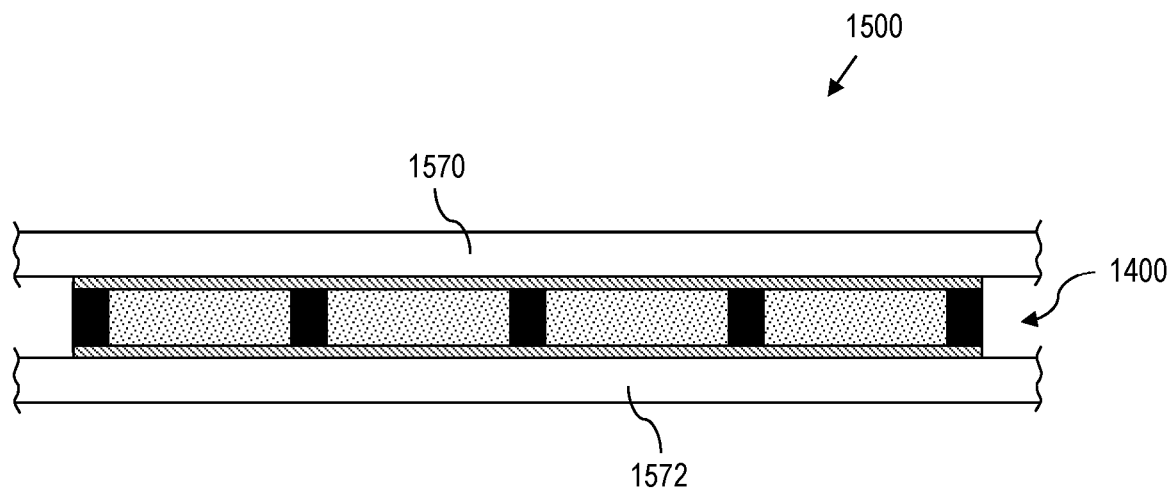
FIG. 15 is an example unitized construction panel system embodying a unitized structure.

Referring to FIG. 15, an example construction panel system 1500 embodies a unitized structure described more fully herein. For purpose of description, the unitized structure 1400 of FIG. 14 is embodied in the construction panel system of FIG. 15. However, the embodiment of FIG. 15 can utilize other unitized structure configurations and may incorporate the various definitions, hardware, components, processes, and embodiments disclosed in any of the preceding figures, and can be combined in any combination of components described with reference thereto. In this regard, not every disclosed component need be incorporated.

More specifically, in an example embodiment, the unitized structure 1500 is disposed between a first drywall panel 1570 and a second drywall panel 1572 to form at least a portion of the construction panel system 1500 shown in FIG. 15. Here, the first drywall panel 1570 and the second drywall panel 1572 can be applied to an already unitized structure (e.g., the unitized structure 1400 of FIG. 14). In other embodiments, the first drywall panel 1570 and the second drywall panel 1572 can be applied to the unitized structure 1400 of FIG. 14 before unitizing. As such, the entire assembly 1500 becomes unitized.

In the example implementation, each of the first and second drywall panels 1570, 1572 has a thickness about ¼ inch (approximately 0.635 centimeters) to about 1 inch (approximately 2.54 centimeters). Other drywall panel thicknesses are possible. It is conceivable that the unitized structure 1500 be disposed between panels other than drywall panels. For example, the unitized structure 1500 can be disposed between cement board panels, OSB board, decorative facings, etc., to form a construction panel system. Moreover, joints/unions can be provided to join sections of construction panel, e.g., using one or more of the systems disclosed herein.

Twelfth Example Unitized Structure

Figure 16:
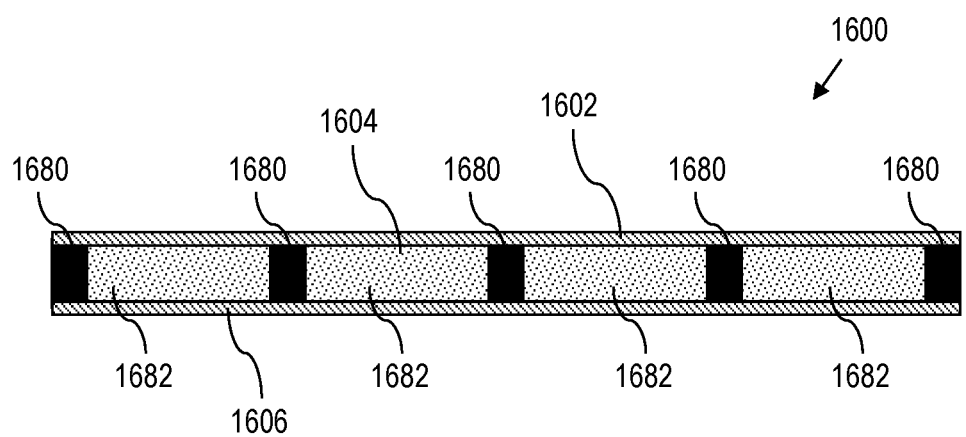
FIG. 16 is a vertical cross-sectioned, side view of an alternate embodiment of the unitized structure of FIG. 1 according to aspects of the present disclosure.
Figure 17:
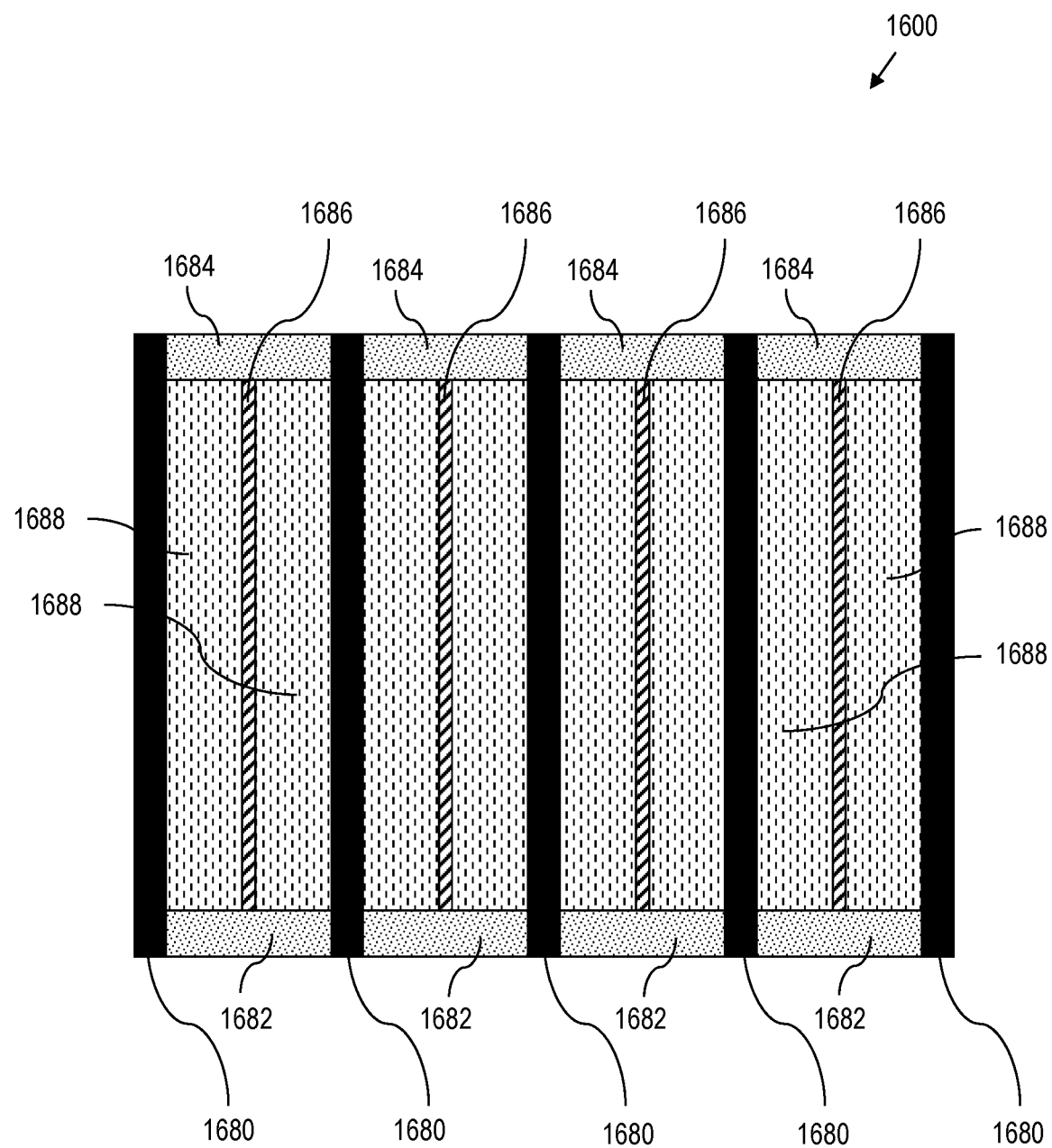
FIG. 17 is a horizontally cross-sectioned, top down view of the unitized structure of FIG. 16.

In another example implementation shown in FIGS. 16 and 17, a unitized structure 1600 is illustrated according to aspects of the present disclosure. FIG. 16 is a side view that illustrates a vertical cross-section of the unitized structure. FIG. 17 illustrates a horizontal cross-section viewed from top down.

The unitized structure 1600 is similar to the unitized structure 100 shown in FIGS. 1 and 2. As such, like components are illustrated with like reference numerals 1500 higher than shown in FIGS. 1 and 2. The unitized structure 1600 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated.

As shown in FIGS. 16 and 17, the intermediate layer 1604 comprises a series of beam members 1680, a first series 1682 of low density insulating material disposed between adjacent beam members of the series of beam members 1680, a second series 1684 of low density insulating material disposed between adjacent beam members of the series of beam members 1680, and a series 1686 of ribs connected between the first and second series 1682, 1684 of low density insulating material. In some embodiments, the intermediate layer 1604 further comprises batting 1688 disposed within the spaces between the first and second series 1682, 1684 of low density insulating material and the spaces between adjacent beam members of beam members 1680 as shown in FIG. 17.

The center-to-center distance between adjacent beam members of beam members 1680 can be any dimension. As an example, the center-to-center distance between adjacent beam members of beam members 1680 can be 16 inches (approximately 40.64 centimeters).

Each of the first and second series 1682, 1684 of low density insulating material comprises a combination of foam and an inorganic fire-retardant material. Other materials of the low density insulating material are possible. The specific thickness and dimensions of each piece of the first and second series 1682, 1684 of low density insulating material is selectable to provide a desired insulation rating. The dimensions of each rib of the series 1686 of ribs connected between the first and second series 1682, 1684 of low density insulating material is selected to accommodate the specific thickness and dimensions of the corresponding pieces of the first and second series 1682, 1684 of low density insulating material selected. Each rib of the series of ribs 1686 can be any type of material (e.g., wood) that can support the first and second series 1682, 1684 of low density insulating material when the first and second series 1682, 1684 of low density insulating material are under pressure.

The batting 1688 disposed within the spaces between the first and second series 1682, 1684 of low density insulating material and the spaces between adjacent beam members of beam members 1680 can comprise any type of light-weight insulating material. As an example, the batting 1688 can comprise mineral wool. Other materials of the batting 1688 are possible. The size of a particular rib 1686 and the amount of batting 1688 between that particular rib can be controlled to provide a desired tradeoff of insulation rating and panel strength of the unitized structure 1600. For example, more batting 1688 and a smaller-sized rib 1686 are used when a higher insulation rating and a lower panel strength are desired. Similarly, less batting 1688 and a larger-sized rib 1686 are used when a lower insulation rating and a higher panel strength are desired.

Example of a Unitized Structure in a Construction Panel System

Figure 18:
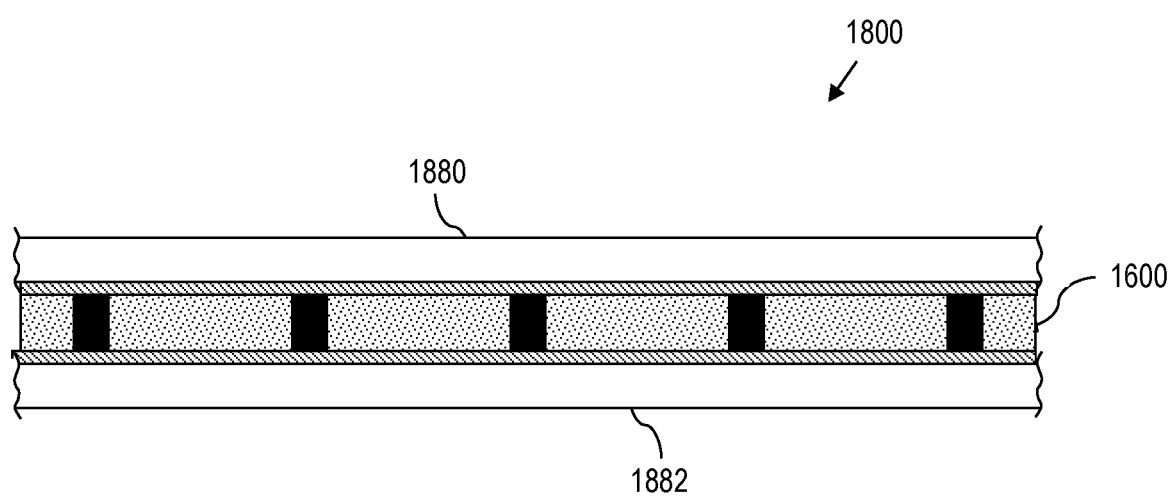
FIG. 18 is an example construction panel system embodying a unitized structure.

Referring to FIG. 18, an example construction panel system 1800 embodying the unitized structure 1600 described herein is illustrated. The unitized structure 1600 of FIGS. 17 and 18 is embodied in the construction panel system of FIG. 18. More specifically, the unitized structure 1600 is disposed between a first panel 1880 (e.g., gypsum board or cement board) and a second panel 1882 (e.g., gypsum board or cement board) to form at least a portion of the construction panel system 1800 shown in FIG. 18. It is conceivable that the unitized structure 1800 be disposed between panels other than gypsum board or cement board, e.g., a decorative panel, OSB, etc.

Unitized Construction Panel Example

Figure 19:
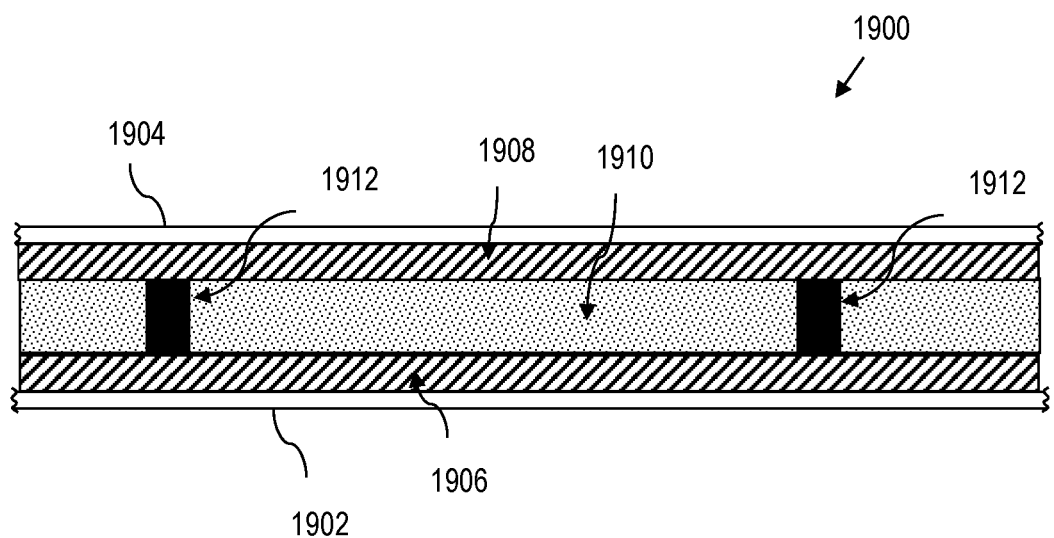
FIG. 19 is an example unitized construction panel according to aspects of the present disclosure.

Referring to FIG. 19, a unitized construction panel 1900 is disclosed according to aspects of the present disclosure. The unitized structure 1900 can be manufactured using any process or combination thereof as set out herein and may incorporate the various definitions, hardware, components, processes, and embodiments disclosed in any of the preceding figures, and can be combined in any combination of components described with reference thereto. In this regard, not every disclosed component need be incorporated. The measurements listed herein are for illustrative purposes only.

In a working example, the unitized construction panel 1900 comprises a first layer 1902, such as a fiberglass/fire retardant composite (e.g., approximately 0.1 inches or 0.254 centimeters thick). The unitized construction panel 1900 also comprises a second layer 1904, such as a fiberglass/fire retardant composite (e.g., approximately 0.1 inches or 0.254 centimeters thick).

The unitized construction panel 1900 further comprises an intermediate layer disposed between the first layer 1902 and the second layer 1904, which includes a first material 1906 and a corresponding second material 1908 (e.g., each comprised of plywood, OSB, cement board, drywall, combination thereof, etc.) The first layer material 1906 and the second layer material 1908 can be between 0.5 inches (approximately 1.27 centimeters) to ⅝ inches (approximately 1.59 centimeters).

At least one of the first layer, the second layer, and the intermediate layer, is treated with a fire-resistant fire-retardant resin as described herein.

The intermediate layer also comprises insulation 1910 between the first layer material 1906 and the second layer material 1908. The insulation 1910 can comprise wood, balsa wood, mineral wool, batting, fiberglass (with or without ribs), foam, honeycomb, or combinations thereof, etc. The insulation 1910 can be any desired thickness. However, in various practical applications may utilize insulation 1910 that is 4 inches (approximately 10.16 centimeters) to about 12 inches (approximately 30.48 centimeters) thick.

The intermediate layer still further comprises one or more beams 1912. Each beam 1912 may comprise wood, steel, aluminum, plywood, foam, high density foam, balsa wood, fiberglass, fiberglass with ribs, fiberglass with pultruded channels, combinations thereof, or other suitable material. For instance, conventional 2×4 lumber can be used to define each beam 1912. Moreover, spacing between adjacent beams is set to any designed for separation. For example, spacing between the beams can be between about 16 inches (approximately 40.64 centimeters) to about 24" (approximately 60.96 centimeters).

In an example implementation, the entire panel assembly 1900 is unitized (e.g., by a vacuum or other mechanism as set out more fully herein with reference to previous figures).

Embodiments May Be Mixed

Figure 20:
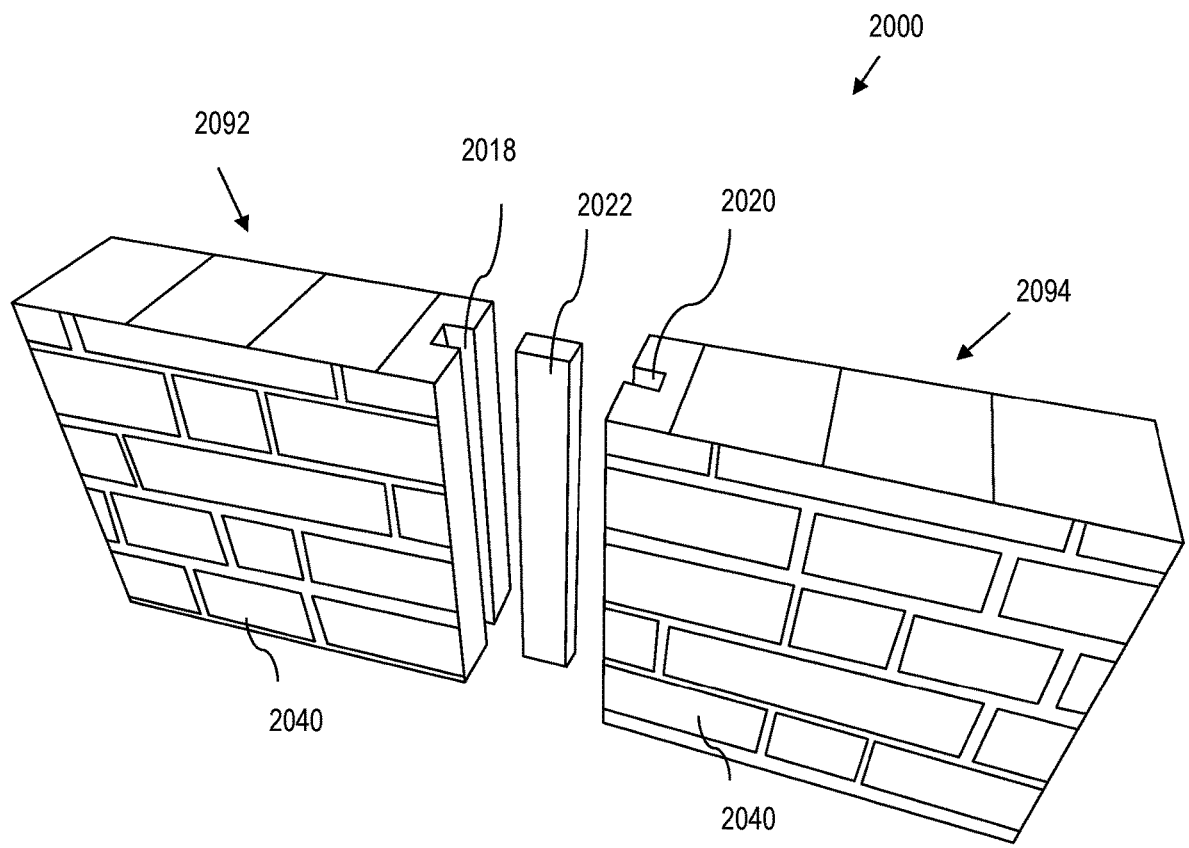
FIGS. 20-21 illustrate a process of assembling unitized construction panels with a tenon, according to aspects of the present disclosure.
Figure 21:
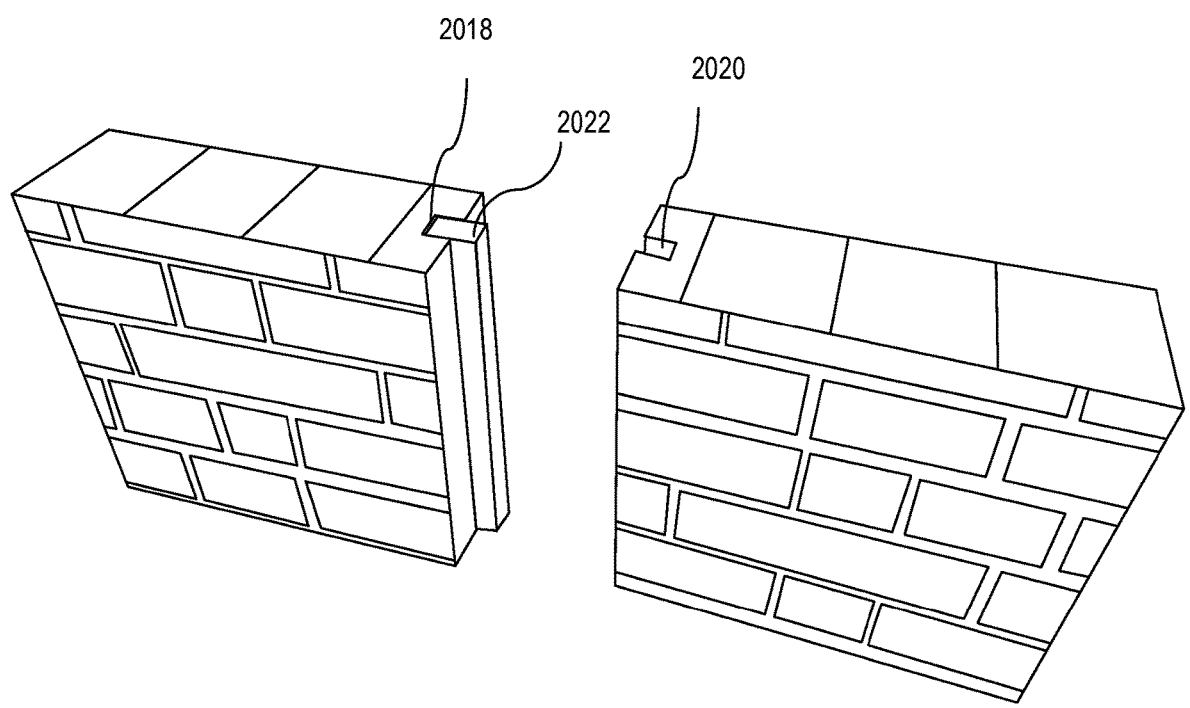

FIGS. 20-21 illustrate a unitized construction panel 2000 created with a tenon 2022 (see FIG. 8) and having a skin 2040 (see FIG. 11). In FIG. 20, a first multilayer structure 2092 and a second multilayer structure 2094 are shown, each having a skin 2040 with a faux brick pattern. The tenon 2022 corresponds to a groove 2018 of the first multilayer structure 2092, as shown in FIG. 21. Further, the second multilayer structure 2094 includes a groove 2020 that also corresponds to the tenon 2022. Thus, embodiments of FIG. 8 and FIG. 11 are combined into one embodiment. Further, any of the embodiments described above may be combined to produce embodiments of the unitized construction panels described herein.

FURTHER ADVANTAGES OF THE PRESENT DISCLOSURE

The unitized structures as disclosed here may be used for installation in new commercial buildings or new residential housings. Moreover, it is conceivable that existing commercial buildings or residential housings can be retrofitted with the unitized structures fabricated in accordance with different embodiments, used in temporary applications, etc.

The unitized structures may also be further reinforced for various applications. For example, edges of each unitized structure can comprise a rigid structure, e.g., wood, composite, steel, aluminum, etc. For instance, unitized structures can be constructed with beams or beam materials on the edges in addition to the internal areas of a panel. Moreover, the panels can have a designed for finish, e.g., paint, film, gypsum board, etc.

The unitized structures as disclosed herein can provide other advantages over some traditional construction panels. For instances, in certain implementations the unitized structures herein can provide up to 90% fewer joints than wood or metal SIP, higher and/or effective R-value (i.e., insulation); improved energy efficiency, lower weight, combinations thereof, etc. In certain embodiments, the unitized structures herein can provide a panel having a weight that is 25-40% lighter than wood SIP and/or up to 15% lighter than steel SIP. This may result in lower transportation and installation cost, lower maintenance and total ownership cost, etc. Moreover, composite structural insulated panels herein can be resistant to corrosion, rot and decay.

According to yet further aspects, the unitized structures herein can be manufactured using a manufacturing process that leverages a construction comprising a fiberglass fabric and mat (bottom skin layer), a foam core placed on the bottom skin layer, a fiberglass fabric and mat (top skin layer), fire retardant resin dispensed on the layup or components thereof, combinations thereof, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A process of fabricating a unitized structure having a fire rating, the process comprising:
   obtaining an assembly, the assembly comprising:
      a first layer that is permeable to a fire-retardant resin;
      a second layer; and
      an intermediate layer comprising a low density, porous insulating material, wherein the intermediate layer is disposed between the first layer and the second layer;
   heating the assembly for a predetermined heating time;
   applying a vacuum to the assembly for a predetermined vacuum time, the applied vacuum being sufficient for the fire-retardant resin to penetrate the first layer but insufficient to penetrate the intermediate layer without a scrim layer; and
   controlling a delivery operation wherein the fire-retardant resin is applied to at least a portion of an outside of the first layer of the assembly such that upon completion of the predetermined vacuum time and the predetermined heating time, a unitized structure having a fire rating is fabricated.

2. A process of fabricating a unitized structure having a fire rating, the process consisting of:
   obtaining an assembly, the assembly consisting of:
      a first layer that is permeable to a fire-retardant resin;
      a second layer; and
      an intermediate layer comprising a low density, porous insulating material, wherein the intermediate layer is disposed between the first layer and the second layer;
   heating the assembly for a predetermined heating time;
   applying a vacuum to the assembly for a predetermined vacuum time, the applied vacuum being sufficient for the fire-retardant resin to penetrate the first layer but insufficient to penetrate the intermediate layer; and
   controlling a delivery operation wherein the fire-retardant resin is applied to at least a portion of an outside of the first layer of the assembly such that upon completion of the predetermined vacuum time and the predetermined heating time, a unitized structure having a fire rating is fabricated.

3. The process of claim 2, wherein:
   controlling the delivery operation comprises applying the fire-retardant resin, the fire-retardant resin having a predetermined ratio of foam and inorganic fire-retardant material to achieve the fire rating.

4. The process of claim 2, wherein the first layer is formed from at least two materials.

5. The process of claim 2 further comprising releasing the vacuum after the predetermined vacuum time.

6. The process of claim 2, wherein heating the assembly comprises:
   heating the assembly at a first temperature for a first predetermined heating time; and
   heating the assembly at a second temperature for a second predetermined heating time.

7. The process of claim 2 further comprising:
   installing a series of beam members over the first layer, wherein the series of beam members are disposed throughout the low density insulating material.

8. The process of claim 7, wherein installing the series of beam members over the first layer comprises installing unidirectional ribs and fiberglass-reinforced foam between the unidirectional ribs over the first layer.

9. The process of claim 7, wherein at least one beam of the series of beam members is wood selected from the group consisting of plywood, hardwood, and balsa wood.

* * * * *